United States Patent Office 3,767,619
Patented Oct. 23, 1973

3,767,619
PROCESS FOR THE PREPARATION OF
POLY(DIHALOPHENYLENE) ETHERS
Glenn D. Cooper, Delmar, N.Y., assignor to
General Electric Company
No Drawing. Filed Oct. 14, 1971, Ser. No. 189,194
Int. Cl. C08g 23/18
U.S. Cl. 260—47 ET                              19 Claims

ABSTRACT OF THE DISCLOSURE

Poly(2,6-dihalo-1,4- and 3,5-dihalo - 1,2 - phenylene) ether homopolymers and copolymers thereof with 2,6-disubstituted phenols are provided by polymerizing a dry salt of the corresponding 4-halophenolate with a free radical initiator in the complete absence of water and in the presence of a complexing agent which contains at least one phosphorus-nitrogen bond.

This invention relates to an improved process to prepare poly(2,6-dihalo-1,4- and 3,5-dihalo-1,2 - phenylene)ethers and copolymers thereof with 2,6 - di - substituted - 1,4-phenylene ethers. More particularly, it is concerned with a process for polymerizing anhydrous salts of the corresponding 2,6-di-substituted-4-halophenolate anions in an entirely water-free medium in the presence of an improved complexing agent. The products are thermoplastic high molecular weight polymers suitable for processing into fibers, films and molded articles.

BACKGROUND OF THE INVENTION

In Stamatoff, U.S. 3,257,358, there are described two processes for the preparation of poly(dihalophenylene) ethers, both of which comprise polymerization by a free radical-initiated elimination of an alkali metal halide from the anhydrous alkali metal salt of 2,4,6-trihalophenol. In one process the reaction is carried out in a two-phase aqueous-liquid organic solvent system as the polymerization medium. In the second process, the polymerization is carried out in the complete absence of water, in chlorobenzene, benzene or some other suitable solvent for the polymer, and in the presence of a complexing agent. The second process is preferred because a linear 1,4-polyphenylene ether is produced from certain phenols, such as 2,6-dichloro-4-bromophenol. With the less preferred two-phase aqueous-organic system as the polymerization medium, even with 2,6-dichloro-4-bromophenol, there is usually formed a significant amount of polymer containing a 1,2-structure as a by-product because of polymerization through coupling by elimination of the halogen atom ortho to the oxygen atom.

With respect to the second, and preferred, process, i.e., effecting the polymerization in the complete absence of water, a complexing agent is essential to the production of high molecular weight polymers. The Stamatoff patent discloses that dimethyl sulfoxide and N,N-dialkylamides of carboxylic acids, e.g., dimethyl formamide, only are suitable complexing agents. It is further disclosed that the best results are obtained with a combination of these two types of complexing agents, particularly dimethyl sulfoxide and dimethyl formamide.

It has now been discovered that compounds containing phosphorus-nitrogen bonds are superior complexing agents for this polymerization, either alone or in combination with dimethyl sulfoxide. In particular, the substitution of alkyl amides of phosphoric, pyrophosphoric or phosphonic acids for the complexers disclosed in the Stamatoff patent results in improved yields of polymer and higher molecular weights when the reaction is carried out with the same batch of phenolate ion in the complete absence of water. In addition to hexamethyl phosphoramide other illustrative phosphorus-nitrogen containing compounds providing superior yields in such a process are octamethylpyrophosphoramide and N,N,N',N'-tetramethylphenylphosphonic diamide, and the like.

It is a primary object of this invention to provide an improved process to prepare polyphenylene ether polymers and copolymers from anhydrous phenolate ions in in the complete absence of water.

It is a further object of this invention to provide higher yields of polyphenylene ether polymers and copolymers from anhydrous phenolate ions in the complete absence of water.

Still another object of this invention is to provide polyphenylene ethers having increased molecular weights by polymerizing anhydrous phenolate ions in the complete absence of water, in the presence of a compound containing phosphorus-nitrogen bonds.

DESCRIPTION OF THE INVENTION

The above objects and advantages are readily obtained according to this invention which is in essence:

In a process for the preparation of polyphenylene ether homopolymers and copolymers which comprises admixing initiator concentrations of (a) a free radical precursor initiator with (b) an anhydrous 2,4,6-trihalophenolate ion having the formula

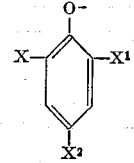

or a mixture of (b) with (c) an anhydrous 2,6-disubstituted-4-halophenolate ion having the formula

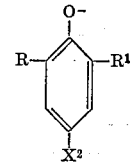

wherein X, $X^1$ and $X^2$ are chloro, bromo or iodo, and R and $R^1$ are monovalent substituents containing from 1 to 12 carbon atoms and are selected from hydrocarbon radicals, halohydrocarbon radicals having at least two carbon atoms between the halogen atoms and the phenol nucleus, hydrocarbonoxy radicals, and halohydrocarbonoxy radicals having at least two carbon atoms between the halogen atom and the phenol nucleus, in the presence of (d) a complexing agent and (e) a liquid organic solvent capable of dissolving the polyphenylene ether homopolymer or copolymer, the improvement which comprises using as said complexing agent (d) a compound containing a phosphorus-nitrogen bond or a mixture of such compound with (e) a polar aprotic compound.

In carrying out the process of this invention, a preformed, dry, alkali metal salt, e.g., sodium, potassium or lithium salt, of a 2,4,6-trihalophenol, or mixture there of with a 2,6-disubstituted-4-halophenol, and especially a 2,6-dichloro-4-bromo-phenol, formed, for example, from the phenol and an alkali metal hydroxide or alkali metal (lower) alkoxide, e.g., sodium hydroxide or sodium methoxide, preferably the latter, is suspended in an organic solvent capable of substantially dissolving the product polymer or copolymer. Suitable solvents include liquid aromatic hydrocarbons, halogenated hydrocarbons and similar known solvents for polymers and copolymers. Preferred solvents are aromatic hydrocarbons such as benzene, toluene, xylene, halogenated-benzene, -toluene or -xylene, trichloroethane or tetrachloroethane with the especially preferred solvents being chlorobenzene or o-dichlorobenzene. To this suspension is added a complexing agent of a phosphorus-nitrogen bonded type; preferably containing the functional group

and to be more particularly described hereinafter. Then is added initiator capable of generating free radicals in an amount sufficient to initiate the polymerization, that is, in concentrations generally varying from about 0.001 to 10 percent by weight of the monomer. Suitable initiators are well known and are described, for example, in the Stamatoff patent. They are, in general, selected from an inorganic peroxide, an organic acid peroxide, a persulfate, a hypochlorite, a hypobromite, an inorganic periodate, or the like. Especially preferred initiators are organic acid peroxides and alkyl hypochlorites, particularly preferred are benzoyl peroxide, lauroyl peroxide and t-butyl hypochlorite. The polymerization initiator may be added stepwise or in its entirety by means of a single addition.

The complexing agent according to this invention contains at least one phosphorus-nitrogen bond and preferably the functional grouping,

wherein the dangling valences broadly may be satisfied by other organic radicals, amino and substituted amino groups, oxygen-phosphorus-nitrogen linkages, and the like. The quantity of complexing agent is not unduly critical but generally the agent is employed in amounts from somewhat less than equimolar to an excess, with respect to the phenolate monomer suspended in the organic liquid reaction medium. Illustrative of preferred complexing agents will be members of the family embraced by the formula

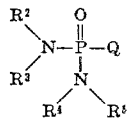

wherein $R^2$, $R^3$, $R^4$ and $R^5$ are alkyl of from 1 to 6 carbon atoms, such as methyl, ethyl, n-propyl, i-propyl, n-butyl, i-butyl, n-pentyl, n-hexyl, 2-methylpentyl, and the like, and Q is selected from mono- or di-carbocyclic aryl or alkyl aryl of from 6 to 12 carbon atoms, preferably phenyl;

wherein $R^6$ and $R^7$ are as defined for $R^2$, $R^3$, $R^4$ and $R^5$ hereinabove; or

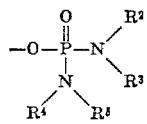

wherein $R^2$, $R^3$, $R^4$ and $R^5$ are as defined hereinabove. Preferred compounds are those in which $R^2$, $R^3$, $R^4$, $R^5$, $R^6$ and $R^7$ are methyl.

One especially preferred member of the above family is hexamethylphosphoramide, which has the formula:

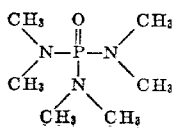

Another especially preferred complexing agent is octamethylpyrophosphoramide which has a formula

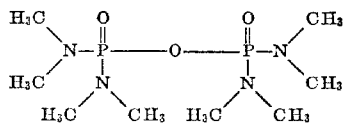

Still another especially preferred complexing agent is phenyl phosphonic diamide which has the formula

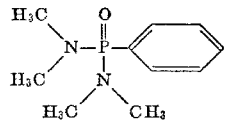

The complexing agent can be used alone, or in combination with a polar aprotic compound. Suitable polar aprotic compounds are the dialkylsulfoxides, e.g., $C_1$–$C_4$ alkyl sulfoxides, such as dimethyl sulfoxide, di-n-propyl sulfoxide, and the like, or N,N-dialkyl carboxylic acid amides such as N,N-dimethyl formamide, N,N-di-n-butyl formamide, N,N-dimethyl acetamide, and the like. In such combinations, the nitrogen-phosphorus bonded compound will comprise the major portion of the complexer, i.e., from about 51 to 99 percent by weight and the polar aprotic compound will comprise the balance, from about 1 to 49 percent by weight.

If the process is to be used to prepare copolymers of 2,6-dihalo-1,4- or 3,5-dihalo-1,2-phenylene ethers and 2,6-disubstituted-1,4-phenylene ethers, the ratio of comonomers can vary widely, but generally will range from 10 to 90 mole percent and from 90 to 10 mole percent of the respective comonomers. If the copolymer contains at least 15 mole percent of the dihalophenylene ether component, it will be flame resistant.

The time necessary to form the polyphenylene ethers in the instant process can vary from several days to substantially less than an hour depending on the polymerization temperature which generally is in the range —20 to 80° C. and preferably 25 to 60° C.

The end of the polymerization is indicated by the absence of any further increase in the viscosity of the organic liquid medium containing the dissolved polymer. The polyphenylene ether products can be separated from the organic solvent by a variety of methods, for example, by distillative removal of the solvent or by precipitative techniques employing precipitants such as methanol.

As has been mentioned, the homopolymers of this invention, and those copolymers containing at least 15 mole percent of the units having dihalo-substitution, provide flame resistant properties at no sacrifice to other properties. All of the homopolymers and copolymers of this invention can be converted to useful articles, e.g., films, fibers and to other molded and extruded shapes.

The polymers and copolymers prepared by the process of this invention may be modified by the addition of stabilizers, antioxidants, filaments, pigments and other additives known in the art.

The polyphenylene ethers prepared by this process are outstanding in utility, particularly at elevated temperatures, for example, as dielectrics, packaging materials, corrosion protectors and appliance and automotive parts. Because the polyphenylene ethers made by the improved process of the present invention have higher molecular weights than heretofore, they are particularly useful for conversion to tough, flexible shapes and find utility as engineering thermoplastics.

DESCRIPTION OF THE PREFERRED EMBODIMENTS

The following examples illustrate the process of this invention. For comparison purposes, several procedures according to the prior art are included. The examples are merely illustrative and are not to be construed to limit the scope of the claims in any manner whatsoever.

Example 1

Ten grams of the anhydrous sodium salt of 2,6-dichloro-4-bromo phenol is dissolved in a mixture of 35 ml. of chlorobenzene and 3 ml. of hexamethylphosphoramide. Two milliliters of dimethyl sulfoxide is added to the rapidly stirred solution, followed by a solution of 0.1 g. of benzoyl peroxide in 1 ml. of chlorobenzene. The mixture is stirred for one hour at room temperature and then for four hours at 58° C. The polymer is precipitated by addition of the reaction mixture to excess acetone, recovered by filtration, washed thoroughly with water, then with acetone, and dried under vacuum at 140° C. There is obtained 5.94 g. of poly(2,6-dichloro-1,4-phenylene)ether, having an intrinsic viscosity of 0.60 dl./g. (in 1,1,1,2-tetrachloroethane at 50° C.).

Comparative Example A

The procedure of Example 1 is carried out under identical conditions except that 3 ml. of N,N-dimethyl formamide the complexing agent described in Stamatoff, U.S. 3,257,358, is substituted for the hexamethylphosphoramide. There is obtained 5.99 grams of poly(2,6-dichloro-1,4-phenylene)ether, having an intrinsic viscosity of 0.38 dl./g.

It can be seen that the hexamethylphosphoramide complexing agent according to this invention provides a product of substantially higher molecular weight in the same reaction time from the same batch of phenolate salt as that produced following the prior art procedure with N,N-dimethyl formamide.

As has been mentioned, the superiority of the phosphorus-nitrogen compounds in comparison with the complexing agents of the prior art resides in the fact that under identical conditions, the product from a given batch of phenolate salt is of a higher molecular weight in the present process. For some reason, not clearly understood at this time, variations from batch to batch of salt affect, e.g., raise or lower, the intrinsic viscosity and yield of the polymer using either the complexing agent of the prior art, or that disclosed herein. To eliminate the effect of such variations, it is important to compare the inherent or intrinsic viscosities using salt from the same batch in both cases.

Similarly to Example 1 and Comparative Example A, but using a different batch of sodium salt, the following results are obtained:

Example 2

The procedure of Example 1 is repeated with 10 grams of anhydrous sodium salt of 2,6-dichloro-4-bromophenol, from a different preparative batch than the salt of that example. Stoichiometric adjustments were made in the other reagents. The poly(2,6-dichloro-1,4-phenylene)ether weighs 5.99 g. and has an inherent viscosity of 0.35 dl./g. (0.5% solution in chlorobenzene at 50° C.). The product contains 40.5% chlorine and 1.0% bromine.

Comparative Example B

The procedure of Example 2 is carried out under identical conditions, except that the hexamethyl phosphoramide is replaced by an equal volume of dimethyl formamide. There is obtained 5.6 g. of product with an inherent viscosity of 0.24 dl./g.

It is thus demonstrated that, even though this batch of salt is not polymerized to as high a molecular weight as that of Example 1, substitution of the complexing agent of this invention for that of the prior art, under identical conditions, leads to a product of higher molecular weight.

It is believed that the primary function of the complexing agent is to increase the rate of bromine displacement compared to chlorine. The following example illustrates this:

Example 3

Five grams of the sodium salt of 2,4-dichloro-6-bromophenol is dissolved in 18 ml. of o-dichlorobenzene, 2 ml. of hexamethylphosphoramide and 1.0 ml. of dimethyl sulfoxide in a screw-capped bottle; 0.1 g. of benzoyl peroxide dissolved in 1 ml. of o-dichlorobenzene is added, and the mixture is shaken for four hours at about 23° C. The polymer, isolated as in Example 1, is largely of the 1,2-ether linked type, resulting from preferential elimination of the ortho-bromine substituent, rather than the para-chlorine substituent. The product contains 40.5% of chlorine and only 7% bromine.

Example 4

A mixture of 4.5 g. of the sodium salt of 2,6-dichloro-4-bromophenol, 1.8 g. of N,N,N',N'-tetramethylphenylphosphonic acid diamide, 0.5 ml. of dimethyl sulfoxide, and 16 ml. of o-dichlorobenzene are placed in a screw-capped bottle. The mixture is shaken thoroughly, a solution of 0.2 g. of benzoyl peroxide in 1 ml. of chlorobenzene is added, and shaking is continued for four hours at about 23° C. The polymer is precipitated into acetone, collected by filtration, washed and dried as described in Example 1. There is obtained 2.75 g. of poly(2,6-dichloro-1,4-phenylene)oxide, having an inherent viscosity of 0.31 dl./g. (measured in 0.5% solution in chlorobenzene at 50° C.).

For comparison purposes, if the procedure is repeated using an equal volume of N,N-dimethyl formamide in place of the phosphorus-nitrogen compound, the sodium phenolate from the same batch provides polymer with an inherent viscosity of only about 0.1 dl. per g.

Example 5

To a solution of 5.0 g. of the sodium salt of 2,6-dichloro-4-bromophenol in 20 ml. of o-dichlorobenzene and 3 ml. of octamethylpyrophosphoramide is added 0.2 g. of benzoyl peroxide in 1 ml. of o-dichlorobenzene. The mixture is stirred for four hours at 42.5° C. and the polymer isolated as in Example 1. There is obtained 2.97 g. of poly(2,6-dichloro-1,4-phenylene)ether having an inherent viscosity of 0.21 dl./g. (measured in 0.5% solution in chlorobenzene at 50° C.).

Substitution of an equal volume of N,N-dimethyl formamide for the phosphorus-nitrogen compound, with phenolate salt from the same batch, provides polymer with an inherent viscosity of only 0.1 dl./g.

EXAMPLE 6

This is carried out as in Example 5, except that 1.0 ml. of dimethyl sulfoxide is added to the mixture before addition of the benzoyl peroxide. There is obtained 2.99 g. of poly(2,6-dichloro-1,4-phenylene)ether, having an inherent viscosity of 0.29 dl./g.

Substitution of an equal volume of N,N-dimethyl formamide for the phosphorus-nitrogen compound, with phenolate salt from the same batch, provides polymer with an inherent viscosity of only 0.1 dl./g.

Example 7

A solution of 0.2 g. of benzoyl peroxide in 1 ml. of o-dichlorobenzene is added to a solution of 2.84 g. of the sodium salt of 2,6-diphenyl-4-bromophenol and 2.16 g. of the sodium salt of 2,6-dichloro-4-bromophenol in a mixture of 18 ml. of o-dichlorobenzene, 2 ml. of hexamethylphosphoramide and 1 ml. of dimethyl sulfoxide. The mixture is stirred for four hours at 45° C. and the copolymer product is isolated by precipitation with acetone, filtered, washed with 5% aqueous hydrochloric acid, then with water and again with acetone, and finally dried under vacuum at 140° C. The process according to this invention provides a copolymer which yields a flexible colorless transparent film on compression molding.

Example 8

A solution of 2.84 g. of the sodium salt of 2,6-diphenyl-4-bromophenol in 9 ml. of o-dichlorobenzene, 1 ml. of hexamethylphosphoramide and 1 ml. of dimethyl formamide is placed in a screw-capped bottle and a solution of 0.1 g. of benzoyl peroxide in 1 ml. of o-dichlorobenzene is added. The mixture is shaken vigorously for three minutes and a solution of 2.16 g. of the sodium salt of 2,6-dichloro-4-bromophenol is added. Shaking is continued for six hours and the copolymer is recovered as described in Example 1.

Example 9

The procedure of Example 1 is repeated, substituting for the anhydrous sodium salt of 2,6-dichloro-4-bromophenol, stoichiometric amounts of the sodium salts of the following trihalophenolate ions:

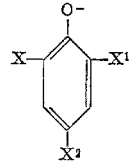

| X | X¹ | X² |
|---|----|----|
| Br | Br | Br |
| Cl | Cl | Cl |
| I | I | Br |
| Cl | Br | Br |
| Cl | I | Br |
| I | Br | Br |

The corresponding poly(dihalophenylene)ethers are obtained.

Based on the teachings herein, the above detailed procedures can be modified by substituting various reactants, catalysts, solvent media, complexing agents and the like to obtain the advantageous results described herein.

By way of illustration, for the sodium salt of 2,6-diphenyl-4-bromophenol, there can be substituted the sodium salts of:

4-bromo-2,6-dimethylphenol;
2,4,6-tribromophenol;
2,6-dimethyl-4-iodophenol;
4-bromo-2,6-diethylphenol;
4-bromo-2,6-diisopropylphenol;
2,6-diethyl-4-iodophenol;
4-bromo-2-methyl-6-i-propylphenol;
4-bromo-2-ethyl-6-methylphenol;
4-bromo-2-n-butyl-6-methylphenol;
4-bromo-2-chloro-6-methylphenol;
4-bromo-2,6-dicyclohexylphenol;
4-bromo-2,6-diallylphenol;
4-bromo-2,6-dibenzylphenol;
4-bromo-2,6-di(2-p-tolylethyl)phenol;
4-bromo-2,6-di(2-chloroethyl)phenol;
4-chloro-2,6-diphenylphenol;
2,6-diphenyl-4-iodophenol;
4-bromo-2,6-di(3-methylphenyl)phenol;
4-bromo-2,6-dimethoxyphenol; and
4-bromo-2,6-di(2-chloroethoxy)phenol.

Similarly, the process of this invention can be carried out with other complexing agents. For example, there can be used N,N,N',N',N'',N''-hexaethylphosphoramide;
N,N,N',N',N'',N''-hexa-n-hexylphosphoramide;
N,N,N'N'-tetraethylphenylphosphonic acid amide;
N,N,N',N'-tetra-n-hexylphenylphosphonic acid amide;
octaethylpyrophosphoramide;
octa-n-hexylpyrophoramide;
N,N,N',N'-tetramethylbenzylphosphonic acid amide; and
N,N,N',N'-tetramethyl-α-naphthylphosphonic acid amide.

The benzoyl peroxide initiator can be replaced with the following free radical precursor initiators with similar results:

tertiary butyl hypochlorite;
lauroyl peroxide;
ammonium persulfate; and
tertiary butyl hypobromite.

The o-dichlorobenzene reaction medium can be replaced with the following solvents, with similar results:

benzene;
toluene;
o-xylene;
trichloroethane
tetrachloroethane.

Obviously, other modifications and variations of the present invention are possible in the light of the above teachings. It is, therefore, to be understood that changes may be made in the particular embodiments of the invention described which are within the full intended scope of the invention as defined by the appended claims.

I claim:

1. In a process for the preparation of polyphenylene ether homopolymers and copolymers which comprises admixing initiator concentrations of (a) a free radical precursor initiator with (b) an anhydrous 2,4,6-trihalophenolate ion having the formula

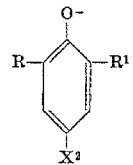

or a mixture of (b) with (c) an anhydrous 2,6-disubstituted-4-halophenolate ion having the formula

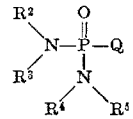

wherein X, X¹ and X² are chloro, bromo or iodo, and R and R¹ are monovalent substituents containing from 1 to 12 carbon atoms and are selected from hydrocarbon radicals, halohydrocarbon radicals having at least two carbon atoms between the halogen atoms and the phenol nucleus, hydrocarbonoxy radicals, and halohydrocarbonoxy radicals having at least two carbon atoms between the halogen atom and the phenol nucleus, in the presence of (d) a complexing agent and a liquid organic solvent capable of dissolving the polyphenylene ether homopolymer or copolymer, the improvement which comprises using as said complexing agent (d) a phosphorus-nitrogen compound of the formula $$\begin{array}{c} R^2 \quad O \\ \diagdown \parallel \\ N-P-Q \\ \diagup \mid \\ R^3 \quad N \\ \diagup \diagdown \\ R^4 \quad R^5 \end{array}$$

wherein
R², R³, R⁴ and R⁵, are alkyl of from 1 to 6 carbon atoms and

Q is selected from mono- or di-carbocyclic aryl or alkyl aryl of from 6 to 12 carbon atoms;

$$-N\diagup_{R^7}^{R^6}$$

wherein R⁶ and R⁷ are alkyl of from 1 to 6 carbon atoms; or

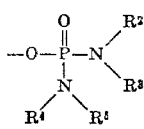

wherein R², R³, R⁴ and R⁵ are as defined hereinabove, or a mixture of a major amount of such compound (d) with (e) a minor amount of a compound selected from the group consisting of dialkyl sulfoxides and N,N-dialkyl carboxylic acid amides.

2. A process as defined in claim 1 wherein the phenolate ion comprises a mixture of from 10 to 90 mole percent of the 2,4,6-trihalophenolate component (b) and from 90 to 10 mole percent of the 2,6-disubstituted-4-halophenolate (c).

3. A process as defined in claim 1 wherein, in said 2,4,6-trihalophenolate ion (b), X and X¹ are chloro and X² is bromo.

4. A process as defined in claim 1 wherein, in said 2,6-disubstituted-4-halophenolate ion (c), R and R¹ are alkyl or cycloalkyl of from 1 to 8 carbon atoms; alkenyl or cycloalkenyl of from 1 to 8 carbon atoms; or mono- or di-carbocyclic aryl, alkylaryl or arylalkyl of from 6 to 12 carbon atoms; and X² is chloro or bromo.

5. A process as defined in claim 1 wherein the phenolate ion comprises a mixture of (b) a 2,6-dichloro-4-bromophenolate ion and (c) a 2,6-diphenyl-4-bromophenolate ion.

6. A process as defined in claim 1 wherein said initiator (a) is selected from an inorganic peroxyacid salt, an organic acid peroxide, a hypochlorite or a hypobromite.

7. A process as defined in claim 6 wherein said initiator (a) is an organic acid peroxide.

8. A process as defined in claim 7 wherein said initiator (a) is benzoyl peroxide.

9. A process as defined in claim 1 wherein said liquid organic solvent (e) is an aromatic hydrocarbon or a halogenated hydrocarbon.

10. A process as defined in claim 9 wherein said liquid organic solvent (e) is selected from benzene, toluene, xylene, o-halogenated-benzene, n-toluene or -xylene, trichloroethylene or tetrachloroethylene.

11. A process as defined in claim 9 wherein said liquid organic solvent (e) is chlorobenzene or o-dichlorobenzene.

12. A process as defined in claim 1 wherein, in said phosphorus-nitrogen compounds (d), R², R³, R⁴, R⁵, R⁶ and R⁷ are each methyl.

13. A process as defined in claim 1 wherein said phosphorus-nitrogen compound (d) is of the formula

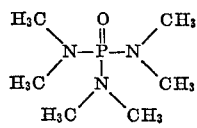

14. A process as defined in claim 1 wherein said phosphorus-nitrogen compound (d) is of the formula

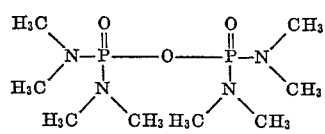

15. A process as defined in claim 1 wherein said phosphorus-nitrogen compound (d) is of the formula

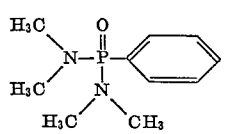

16. A process as defined in claim 1 wherein (e) is dimethyl sulfoxide.

17. A process as defined in claim 1 wherein (e) is N,N-dimethyl formamide.

18. In a process for the preparation of polyphenylene ether homopolymers and copolymers which comprises admixing initiator concentrations of (a) a free radical precursor initiator with (b) an anhydrous 2,4,6-trihalophenolate ion having the formula

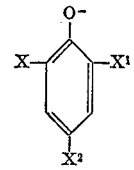

or a mixture of (b) and (c) an anhydrous 2,6-disubstituted-4-halophenolate ion having the formula

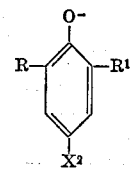

wherein X, X¹ and X² are chloro, bromo or iodo, and R and R¹ are monovalent substituents containing from 1 to 12 carbon atoms and are selected from hydrocarbon radicals, halohydrocarbon radicals having at least two carbon atoms between the halogen atoms and the phenol nucleus, hydrocarbonoxy radicals, and halohydrocarbonoxy radicals having at least two carbon atoms between the halogen atom and the phenol nucleus, in the presence of (d) a complexing agent and a liquid organic solvent capable of dissolving the polyphenylene ether homopolymer or copolymer, the improvement which comprises using as said complexing agent (d) a phosphorus-nitrogen compound of the formula

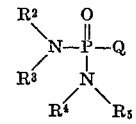

wherein

R², R³, R⁴ and R⁵, are alkyl of from 1 to 6 carbon atoms and

Q is selected from mono- or di-carboxylic aryl or alkyl aryl of from 6 to 12 carbon atoms;

wherein R⁶ and R⁷ are alkyl of from 1 to 6 carbon atoms; or

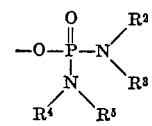

wherein R², R³, R⁴ and R⁵ are as defined hereinabove.

19. In a process for the preparation of polyphenylene ether homopolymers and copolymers which comprises admixing initiator concentrations of (a) a free radical precursor initiator with (b) an anhydrous 2,4,6-trihalophenolate ion having the formula

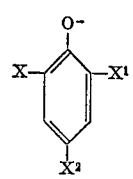

or a mixture of (b) with (c) an anhydrous 2,6-disubstituted-4-halophenolate ion having the formula

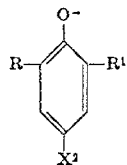

wherein X, X¹ and X² are chloro, bromo or iodo, and R and R¹ are monovalent substituents containing from 1 to 12 carbon atoms and are selected from hydrocarbon radicals, halohydrocarbon radicals having at least two carbon atoms between the halogen atoms and the phenol nucleus, hydrocarbonoxy radicals, and halohydrocarbonoxy radicals having at least two carbon atoms between the halogen atom and the phenol nucleus, in the presence of (d) a complexing agent and a liquid organic solvent capable of dissolving the polyphenylene ether homopolymer or copolymer, the improvement which comprises using as said complexing agent (d) a phosphorus-nitrogen compound of the formula

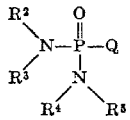

wherein
R², R³, R⁴ and R⁵, are alkyl of from 1 to 6 carbon atoms and
Q is selected from mono- or di-carboxylic aryl or alkyl aryl of from 6 to 12 carbon atoms;

wherein R⁶ and R⁷ are alkyl of from 1 to 6 carbon atoms; or

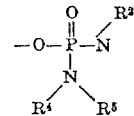

wherein R², R³, R⁴ and R⁵ are as defined hereinabove, or a mixture of from about 51 to 99 percent by weight of such compound (d) with (e) from about 1 to 49 percent by weight of a compound selected from the group consisting of dialkylsulfoxides and N,N-dialkyl carboxylic acid amides.

References Cited
UNITED STATES PATENTS
3,257,358   6/1966   Stamatoff.

MELVIN GOLDSTEIN, Primary Examiner

UNITED STATES PATENT OFFICE
CERTIFICATE OF CORRECTION

Patent No. __3,767,619__                Dated __October 23, 1973__

Inventor(s) __Glenn D. Cooper__

It is certified that error appears in the above-identified patent and that said Letters Patent are hereby corrected as shown below:

Claim 19, Column 12, fifth formula

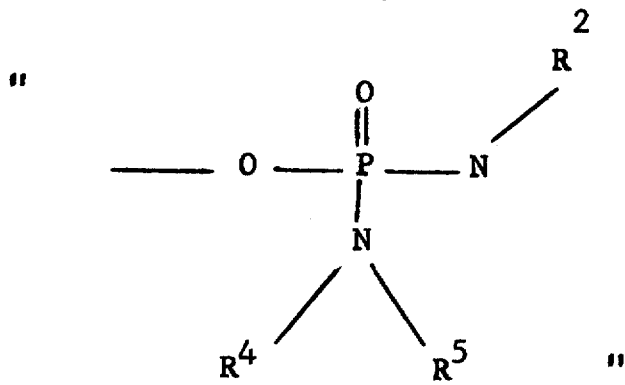

should be --

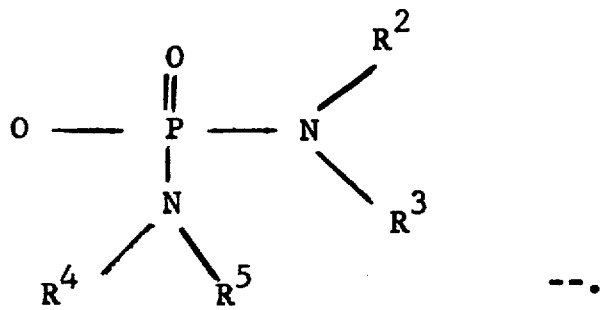

UNITED STATES PATENT OFFICE
CERTIFICATE OF CORRECTION

Patent No. 3,767,619        Dated October 23, 1973

Inventor(s) Glenn D. Cooper                    Page 2

It is certified that error appears in the above-identified patent and that said Letters Patent are hereby corrected as shown below:

Column 5, line 25, "0.38" should be -- 0.37 --;

Column 5, line 65, "5.6 g." should be -- 5.61 g. --.

Signed and sealed this 23rd day of July 1974.

(SEAL)
Attest:

McCOY M. GIBSON, JR.        C. MARSHALL DANN
Attesting Officer           Commissioner of Patents